(12) United States Patent
Magill et al.

(10) Patent No.: US 10,787,214 B2
(45) Date of Patent: Sep. 29, 2020

(54) VEHICLE ASSEMBLY TOOL

(71) Applicant: FORD MOTOR COMPANY, Dearborn, MI (US)

(72) Inventors: Joshua Magill, Royal Oak, MI (US); Christopher J. Wunsch, Plymouth, MI (US); Anthony Serra, Vermillion, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 338 days.

(21) Appl. No.: 15/498,214

(22) Filed: Apr. 26, 2017

(65) Prior Publication Data
US 2017/0313371 A1 Nov. 2, 2017

Related U.S. Application Data

(60) Provisional application No. 62/328,446, filed on Apr. 27, 2016.

(51) Int. Cl.
*B62D 65/12* (2006.01)
*B62D 65/02* (2006.01)
*B23P 19/02* (2006.01)
*B23P 19/06* (2006.01)

(52) U.S. Cl.
CPC .............. *B62D 65/12* (2013.01); *B23P 19/02* (2013.01); *B23P 19/06* (2013.01); *B62D 65/024* (2013.01); *B23P 2700/14* (2013.01)

(58) Field of Classification Search
CPC ...... B62D 65/12; B62D 65/024; B62D 17/00; B23P 19/06; B23P 19/02; B23P 2700/14; Y10S 72/704; B60G 2204/4302; G01B 5/25

USPC ............................................................. 72/704
See application file for complete search history.

(56) References Cited

U.S. PATENT DOCUMENTS

| | | | | |
|---|---|---|---|---|
| 3,807,693 A * | 4/1974 | Castoe | .................... | B25B 27/00 254/1 |
| 4,388,820 A * | 6/1983 | Rickbeil | .................. | B21D 1/14 72/458 |
| 4,575,934 A * | 3/1986 | Kitamura | ................ | B23P 19/04 29/787 |
| 4,805,286 A * | 2/1989 | Uchida | .................. | B62D 65/12 29/404 |
| 5,027,275 A * | 6/1991 | Sakamoto | ............. | G01M 17/06 280/86.758 |
| 5,040,303 A * | 8/1991 | Koerner | .................. | G01B 7/315 33/203 |
| 6,176,501 B1 * | 1/2001 | Bartolone | ................ | B60G 3/20 280/86.756 |
| 6,836,970 B2 * | 1/2005 | Hirano | ................. | G01B 11/275 33/203 |

(Continued)

*Primary Examiner* — Monica S Carter
*Assistant Examiner* — Mahdi H Nejad
(74) *Attorney, Agent, or Firm* — Vincent Mastrogiacomo; Brooks Kushman P.C.

(57) ABSTRACT

A vehicle assembly tool includes a tooling framework, vehicle control arm caster and camber setting tool, nut runners, and half shaft pressing tool. The vehicle control arm caster and camber setting tool is secured to the framework. The nut runners are secured to the framework and are configured to engage fasteners to rotatably fix a vehicle control arm to a vehicle frame. The half shaft pressing tool is secured to the framework and is configured to press a half shaft into a vehicle axle.

17 Claims, 5 Drawing Sheets

(56) References Cited

U.S. PATENT DOCUMENTS

| | | | | |
|---|---|---|---|---|
| 8,322,255 B1* | 12/2012 | Jordan | ................... | B25B 17/00 81/476 |
| 2007/0289151 A1* | 12/2007 | Doan | ..................... | G01B 5/255 33/203 |
| 2009/0100972 A1* | 4/2009 | Hoenke | ................. | B62D 17/00 81/57.22 |
| 2009/0260488 A1* | 10/2009 | Kanazawa | .............. | B25B 13/48 81/58.2 |
| 2010/0242690 A1* | 9/2010 | Tohyama | ................ | B23P 19/06 81/451 |
| 2012/0137522 A1* | 6/2012 | Park | ..................... | B25J 17/0208 29/894.3 |
| 2017/0291269 A1* | 10/2017 | Wells | ..................... | B23P 19/02 |
| 2018/0201319 A1* | 7/2018 | Rogers | ................. | B60G 15/068 |

* cited by examiner

VEHICLE ASSEMBLY TOOL

CROSS-REFERENCE TO RELATED APPLICATIONS

This application claims the benefit of U.S. provisional application No. 62/328,446 filed on Apr. 27, 2016, the disclosure of which is hereby incorporated in its entirety by reference herein.

TECHNICAL FIELD

The present disclosure relates to tooling, and more particularly to tooling utilized for assembling automobiles.

BACKGROUND

Automobile assembly lines include an assortment of tools that are utilized during the assembly process. Each tool may be dedicated to performing one or more specific operations required to complete the assembly process of an automobile. The tools may be manually operated, semi-automated, or fully automated.

SUMMARY

A vehicle assembly tool includes a tooling framework, vehicle control arm caster and camber setting tool, nut runners, and half shaft pressing tool. The vehicle control arm caster and camber setting tool is secured to the framework. The nut runners are secured to the framework and are configured to engage fasteners to rotatably fix a vehicle control arm to a vehicle frame. The half shaft pressing tool is secured to the framework and is configured to press a half shaft into a vehicle axle.

A vehicle assembly tool includes a framework, fixture, pair of locating blocks, first and second nut runners, and pressing tool. The framework is configured to lower into an advanced position over a vehicle frame. The fixture is rotatably secured to the framework and is configured to rotate about a yaw axis relative to the vehicle frame. The pair of locating blocks are secured the fixture. Each block is configured to contact one of a pair of pivot hubs of a vehicle control arm and collectively rotate about the yaw axis via the fixture to set the caster and camber positions of the control arm relative to the vehicle frame. The first and second nut runners are secured to the fixture along first and second linear paths, respectively. The first and second nut runners are configured to advance and engage fasteners extending through the pivot hubs to fix a rotatable position of the control arm relative to the vehicle frame. The pressing tool is secured to the framework along a linear path and is configured to engage a first end of a half shaft and advance to press a second end of the half shaft into a vehicle axle.

A vehicle assembly tool includes locating blocks, pair of nut runners, and pressing tools. The locating blocks are configured to engage backsides of pivot hubs of a vehicle control arm and collectively rotate about a yaw axis relative to a vehicle frame to set the caster and camber positions of the control arm. The pair of nut runners is configured to engage fasteners to rotatably fix the pivot hubs to the frame. The pressing tool is configured to press a half shaft into a vehicle axle.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
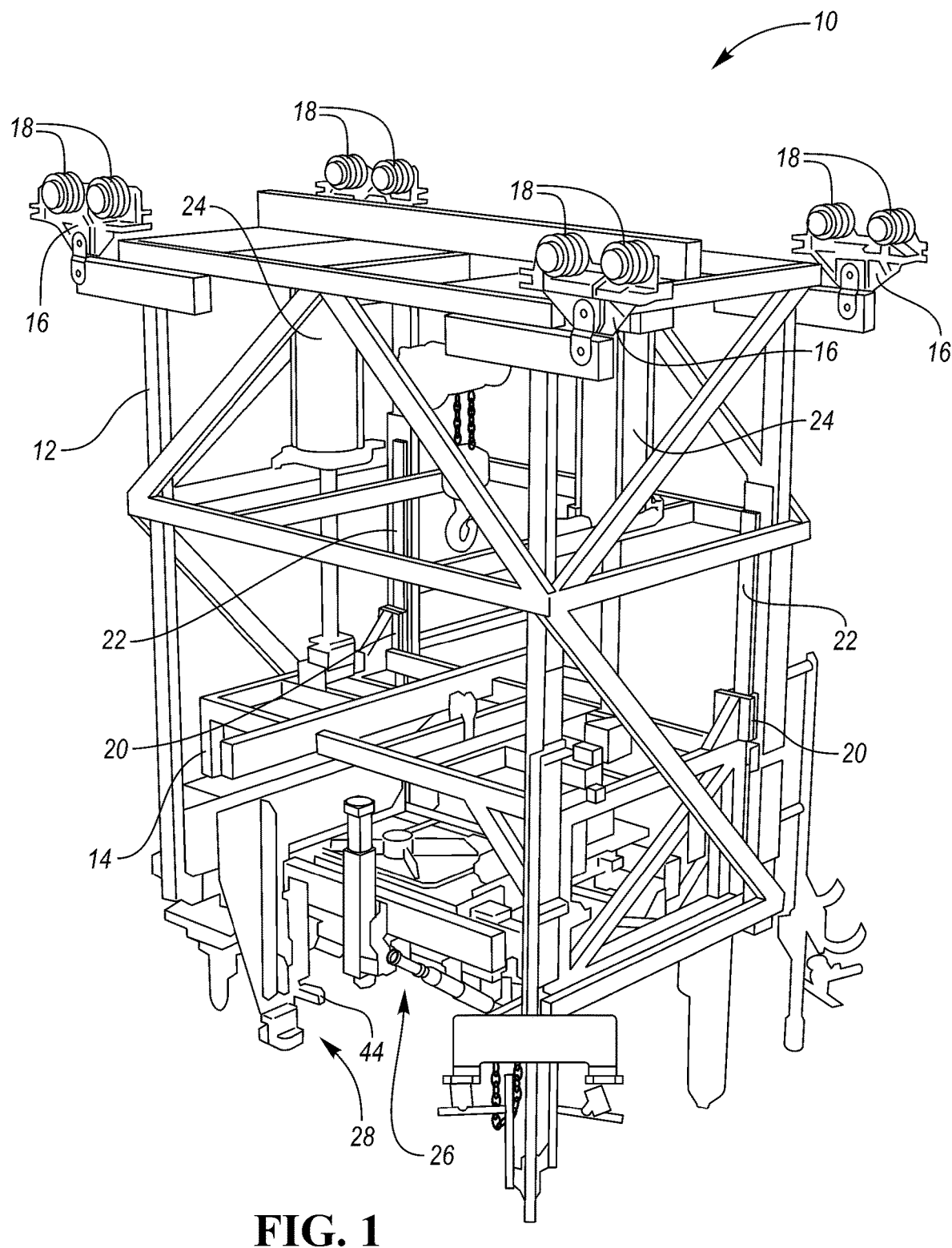
FIG. 1 is an upper perspective view of an assembly tool that sets the caster and camber positions of the lower control arms in the vehicle suspension system and presses the front half shafts into the vehicle axle.

Referring to FIG. 1, an upper perspective view of an assembly tool 10 that sets the caster and camber positions of the lower control arms in the vehicle suspension system and presses the front half shafts into a vehicle axle is illustrated. The assembly tool 10 includes a main framework 12 and a tooling framework 14. The main framework 12 may be secured to a pair of rails (not shown) by hangers 16 that are rotatably attached to wheels 18. The main framework 12 may move in a linear path along the rails via the wheels 18. The tooling framework 14 may be secured to the main framework 12 along a linear path by bearing blocks 20 secured to the tooling framework 14 that engage rails 22 secured to the main framework 12. At least one actuator 24 that is secured to the main framework 12 engages the tooling framework 14 to move the tooling framework 14 up and down along a linear path, so that the tooling framework 14 may lower into an advanced position over a vehicle frame. The actuators 24 are shown to be pneumatic cylinders. However it should be understood that the actuators 24 may be any type of actuator that is capable of providing linear motion including, but not limited to, pneumatic cylinders, hydraulic cylinders, a ball screw and ball nut combination, a servo motor connected to a mechanical cylinder via gears, etc.

A pair of caster and camber setting tools 26 are secured to opposing sides of the tooling framework 14. The caster and camber setting tools 26 are configured to set the caster and camber positions of the driver and passenger side lower control arms of a vehicle relative to the vehicle frame. Caster may refer to the angular displacement of the steering axis from the vertical axis. In a vehicle, the steering axis runs from the center of a ball joint of an upper control arm to the center of a ball joint of a lower control arm. The wheels of the vehicle are secured to and will rotate about this steering axis via the balls joints when the vehicle is being steered. Camber angle in a vehicle is the angle between the vertical axis of the wheels used for steering and the vertical axis of the vehicle when viewed from the front or rear. The caster and camber setting tools 26 are used to set the caster and camber positions of the lower control arms, and therefore the caster and camber positions of the ball joints of the lower control arms, in order to set the desired caster and camber angles of the wheels of the vehicle that are used for steering purposes.

A pair of half shaft pressing tools 28 are secured to opposing sides of the tooling framework 14. The half shaft pressing tools 28 are configured to press the driver side and passenger side half shafts into a vehicle axle. The vehicle axle may more specifically be the front axle of the vehicle (although it could be the rear axle of the vehicle). The front axle of the vehicle may be a transaxle that includes both the elements of a transmission, such as several gear combinations to establish several gear ratios, and the elements of an axle, such as a differential. Alternatively, the front axle of the vehicle may be a stand-alone axle that does not include the elements of the vehicle transmission, where the front axle is mechanically liked to the transmission by a transfer case.

Figure 2:
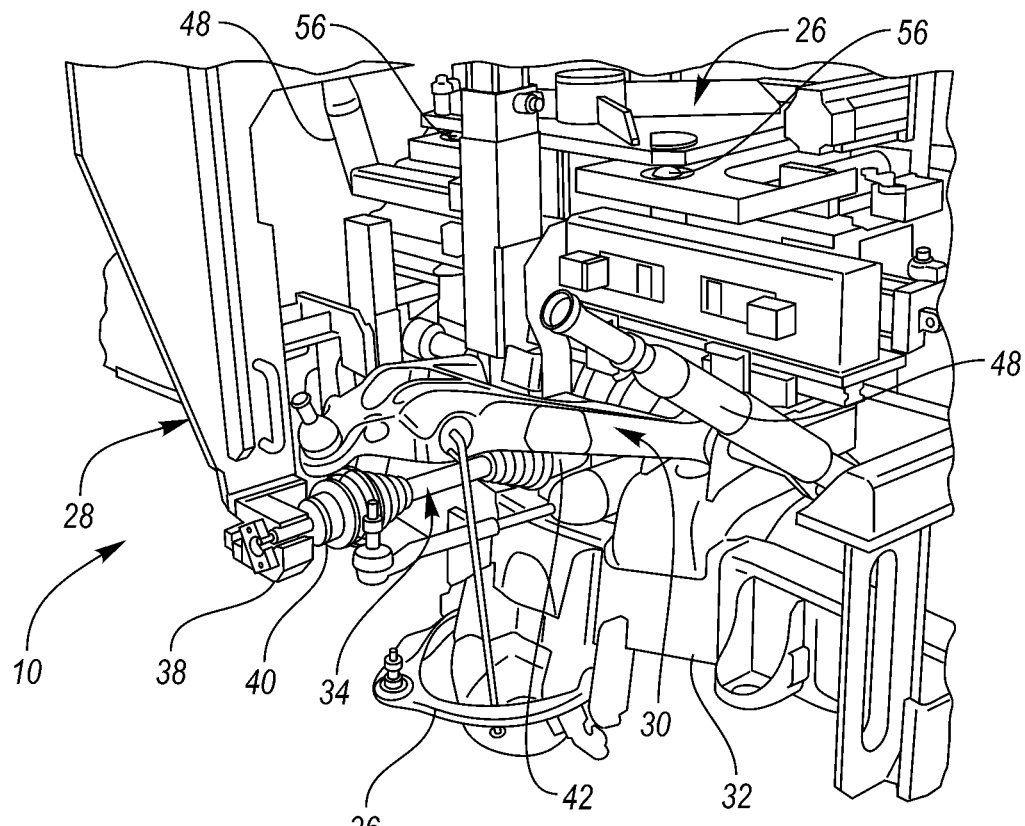
FIG. 2 is an upper perspective view of one side of the assembly tool illustrating the setting of the of the caster and camber positions of one of the lower control arms and the pressing of one of the front half shafts into the vehicle axle.
Figure 3:
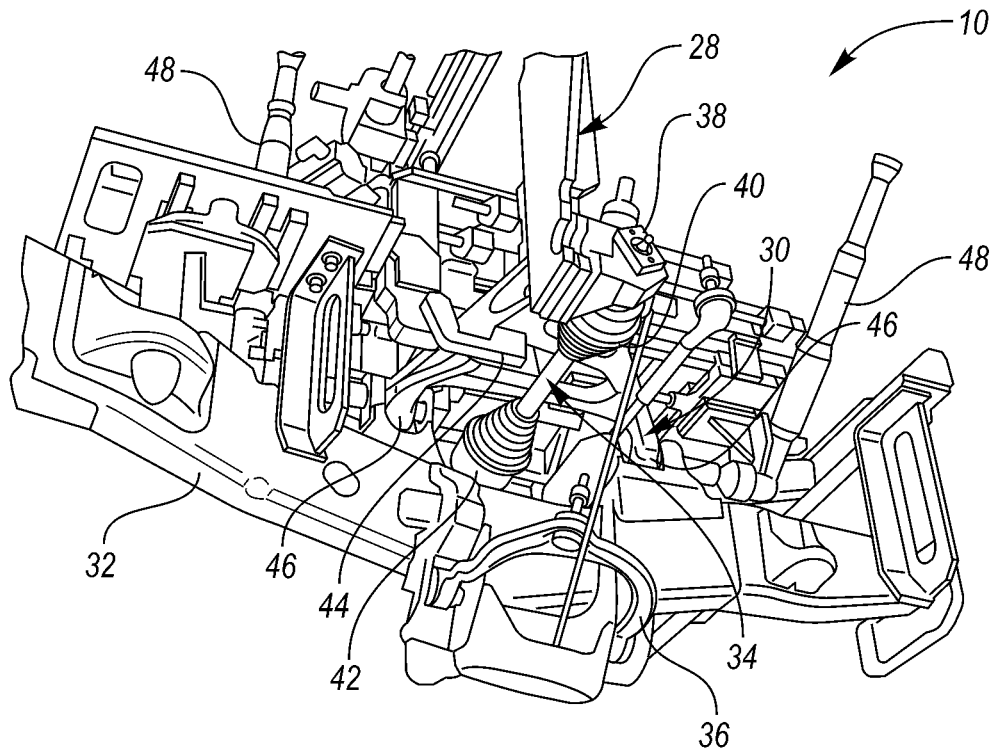
FIG. 3 is a lower perspective view of one side of the assembly tool illustrating the setting of the of the caster and camber positions of one of the lower control arms and the pressing of one of the front half shafts into the vehicle axle.

Referring to FIGS. 2 and 3, an upper perspective view and a lower perspective view of one side of the assembly tool 10 are illustrated, respectively. FIGS. 2 and 3 further illustrate the setting of the of the caster and camber positions of one of a pair the lower control arms 30 relative to a vehicle frame 32 and the pressing of one of a pair of front half shafts 34 into the vehicle axle. It should be noted that the vehicle frame 32 and the lower control arm 30 are oriented upside down such that the lower control arm 30 is located above an upper control arm 36. The half shaft pressing tool 28 includes an end of arm tooling 38 that is configured to engage and support a first end 40 of the half shaft 34. The half shaft pressing tool 28 is configured to advance such that the end of arm tooling 38 applies force to the first end 40 of the half shaft 34 in order to force or press a second end 42 of the half shaft 34 into the vehicle axle.

A lifting arm 44 is secured to the tooling framework 14. It should be noted that the lifting arm 44 may not be directly secured to the tooling framework 14, but that there may be one or more intermediate components that secure lifting arm 44 to the tooling framework 14. The lifting arm 44 is configured to contact a bottom surface of the lower control arm 30 and lift the lower control arm 30 such that the lower control arm 30 rotates upwards about pivot hubs 46 of the lower control arm 30 relative to the vehicle frame 32. The lifting arm 44 is configured to lift the lower control arm 30 into a position such that the caster and camber setting tool 26 can engage the lower control arm 30 in order to set the caster and camber positions of the lower control arm 30. An actuator, such as a servo motor, may be configured to rotate the lifting arm 44 in order to lift the lower control arm 30 into position. However it should be understood that the actuator may be any type of actuator that is capable of providing rotational motion. Once the caster and camber setting tool 26 has set the orientation of the lower control arm 30 to set the caster and camber attributes or positions of the lower control arm 30, a pair of nut runners 48 engage a pair of fasteners to rotatably fix the pivot hubs 46 of the lower control arm 30 to the vehicle frame 32. The nut runners 48 may be pneumatically or electrically powered, and may be configured to run down the fasteners to a desired torque.

Figure 4:
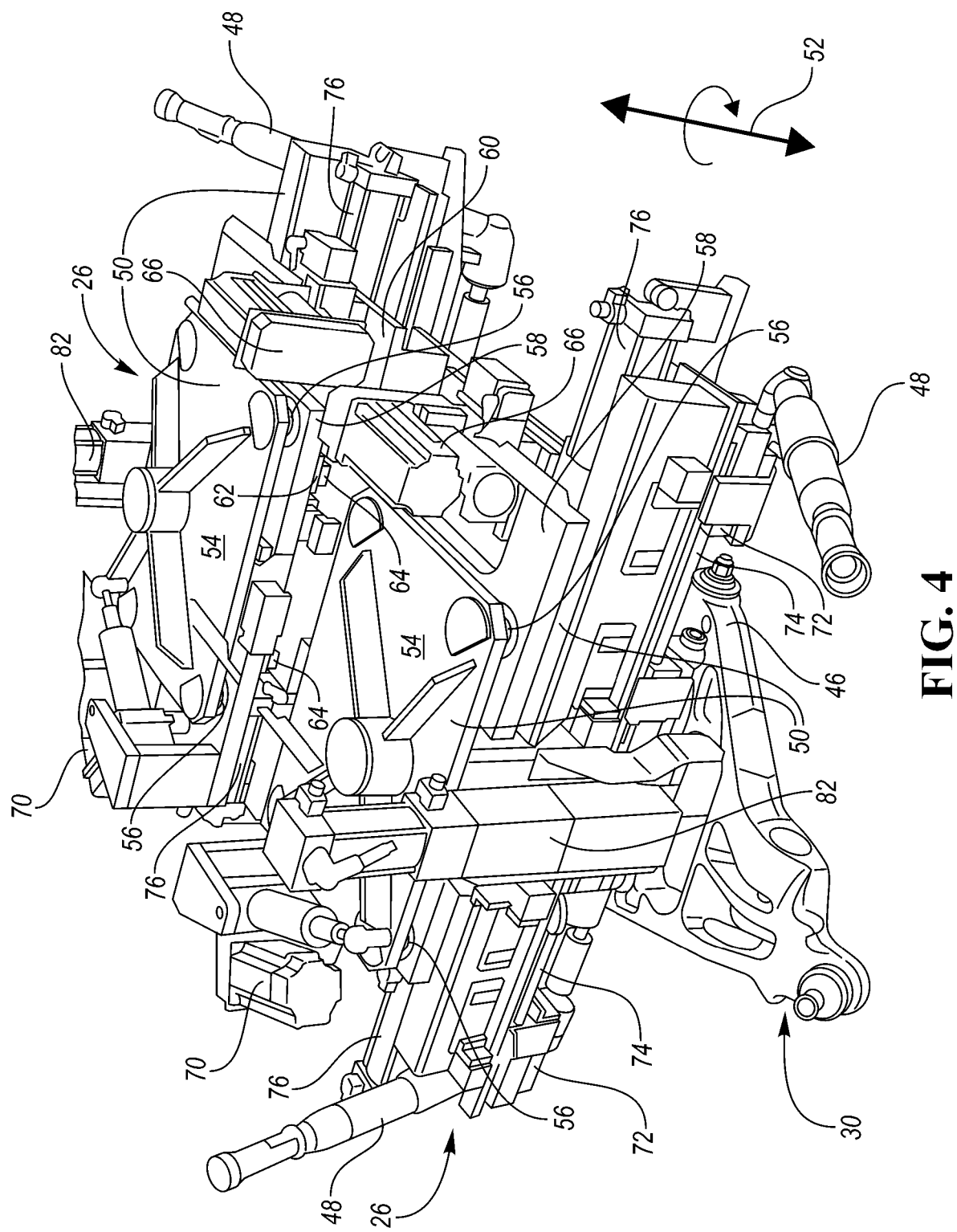
FIG. 4 is an upper perspective view of the tooling that is used to set the caster and camber positions of the lower control arms.
Figure 5:
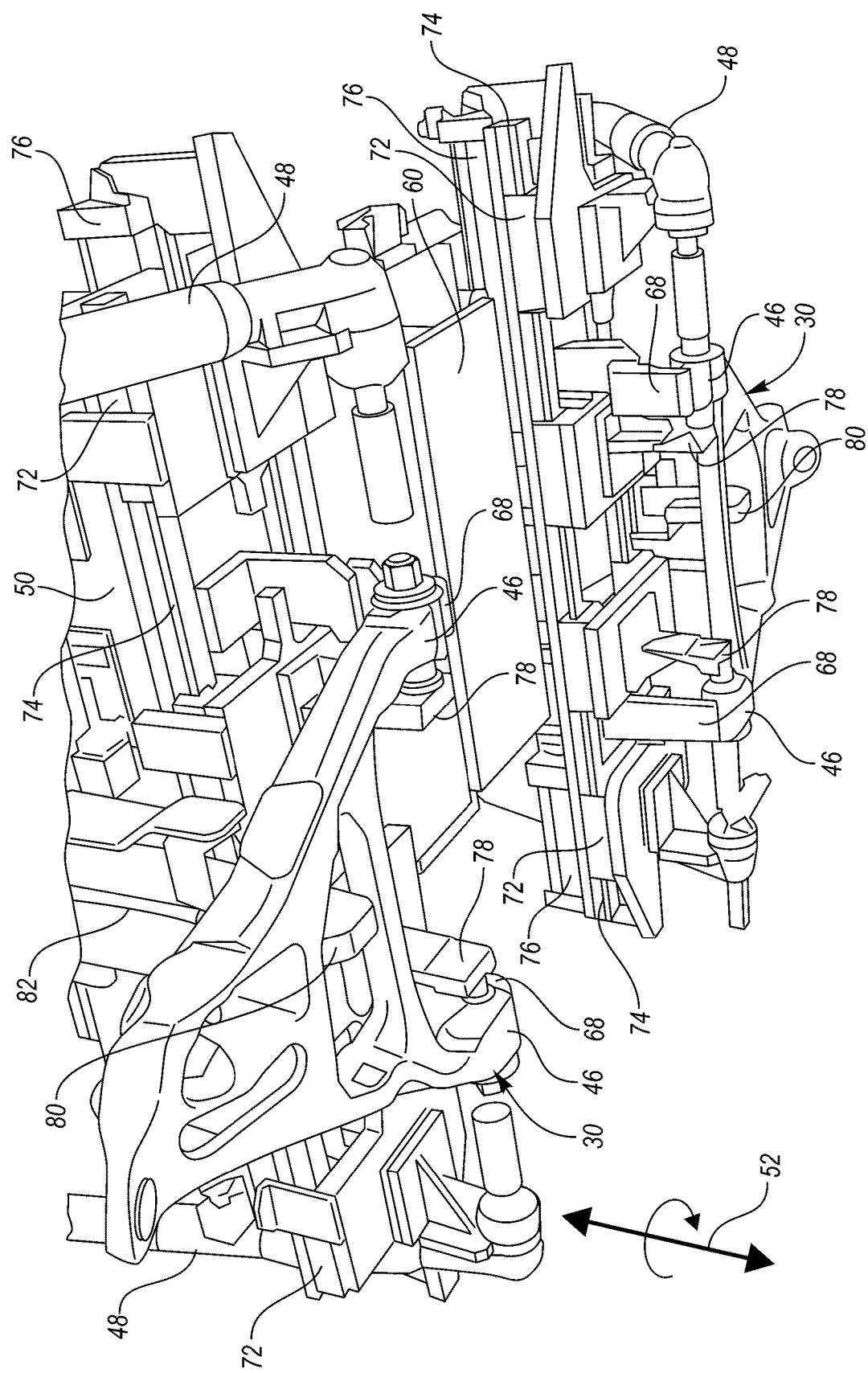
FIG. 5 is a lower perspective view of the tooling that is used to set the caster and camber positions of the lower control arms.

Referring to FIGS. 4 and 5, an upper perspective view and a lower perspective view of the pair of caster and camber setting tools 26 are illustrated, respectively. The lower control arms 30 are shown in FIGS. 4 and 5 while vehicle frame 32 has been removed for illustrative purposes (i.e., so that engagement between the caster and camber setting tools 26 and the lower control arms 30 may be observed). The caster and camber setting tools 26 may include fixtures 50 that are rotatably secured to the tooling framework 14. The fixtures 50 may rotate about a yaw axis 52 and/or translate inboard or outboard relative to the vehicle frame 32. The fixtures 50 may include upper plates 54. The upper plates 54 rest on top of transfer balls 56 that are secured to lower plates 58 so that the upper plates 54 may be rotated or translated relative to the lower plates 58 and the tooling framework 14.

The lower plates 58 are linearly secured to the tooling framework 14. More specifically, the lower plates 58 are linearly secured to a bracket 60 that is part of the tooling framework 14. Other portions of the tooling framework 14 have been removed in FIGS. 4 and 5 for illustrative purposes. The lower plates 58 are secured to the bracket 60 along a linear path by bearing blocks 62 secured to the lower plates 58 that engage rails 64 secured to the bracket 60. Actuators 66 are secured to the bracket 60 and engage the lower plates 58 to move the lower plates 58 along a linear path, so that caster and camber setting tools 26 may advance toward the respective lower control arms 30 and translate the lower control arm 30 inboard or outboard relative to the vehicle frame 32. The actuators 66 are shown to be servo motors connected to mechanical cylinders via gears. However it should be understood that the actuators 66 may be any type of actuator that is capable of providing linear motion including, but not limited to, pneumatic cylinders, hydraulic cylinders, a ball screw and ball nut combination, a servo motor connected to a mechanical cylinder via gears, etc.

Each of the caster and camber setting tools 26 includes a pair of locating blocks 68 that are secured to each respective fixture 50. One of each pair of locating blocks 68 are configured to contact one of the pair of pivot hubs 46 of each control arm 30. Once in contact with the pivot hubs of the respective control arm 30, each pair of locating blocks 68 are configured to rotate collectively about the yaw axis 52, via rotation of the respective fixture 50, and/or translate inboard or outboard relative to the vehicle frame 32, to set the caster and camber positions of the respective control arm 30 relative to the vehicle frame 32. Actuators 70 that are pivotally secured to lower plates 58 engage the upper plates 54 to rotate the fixtures 50 about the yaw axis 52. The actuators 70 are shown to be servo motors connected to mechanical cylinders via gears. However it should be understood that the actuators 70 may be any type of actuator that is capable of providing linear motion including, but not limited to, pneumatic cylinders, hydraulic cylinders, a ball screw and ball nut combination, a servo motor connected to a mechanical cylinder via gears, etc A pair of the nut runners 48 are secured to each fixture 50 along linear paths by bearing blocks 72 secured to the nut runners 48 that engage rails 74 secured to the fixtures 50. The nut runners 48 are configured to advance and engage the fasteners extending through the pivot hubs 46 in order to fix a rotatable position of the control arm 30 relative to the vehicle frame 32. The nut runners 48 are configured to fix the rotatable position of the control arm 30 after the caster in camber positions have been set. Actuators 76 that are secured to the fixtures 50 engages the nut runners 48 along a linear path to engage and disengage the fasteners. The actuators 76 are shown to be pneumatic cylinders. However it should be understood that the actuators 76 may be any type of actuator that is capable of providing linear motion including, but not limited to, pneumatic cylinders, hydraulic cylinders, a ball screw and ball nut combination, a servo motor connected to a mechanical cylinder via gears, etc.

A pair of wrenches 78 may also be secured to each fixture 50. One of the pair of wrenches 78 secured to each fixture 50 may be opposite one of the pair of nut runners 48. Each wrench 78 may be configured to engage and hold one of a nut and bolt combination while the respective nut runner 48 is configured to engage the other of the nut and bolt combination in order to fix the rotatable position of the control arm 30 relative to the vehicle frame. The wrenches may also be secured to each fixture 50 along linear paths by bearing block and rail combinations, and any type of linear actuator may be configured to move the wrenches along the linear path to engage and disengage the wrenches.

Wedge or stop blocks 80 are secured to the fixture 50 along linear paths. The stop blocks 80 may be directly secured to actuators 82. The actuators 82 are configured to advance the stop blocks 80 downward into voids defined by the control arms 30 in order to limit outward transverse movement of the control arms 30 relative to the vehicle frame 32 and to ensure positive contact of the lower control arms 30 to the locating blocks 68. The actuators 82 are shown to be pneumatic cylinders. However it should be understood that the actuators 82 may be any type of actuator that is capable of providing linear motion including, but not limited to, pneumatic cylinders, hydraulic cylinders, a ball screw and ball nut combination, a servo motor connected to a mechanical cylinder via gears, etc.

Figure 6:
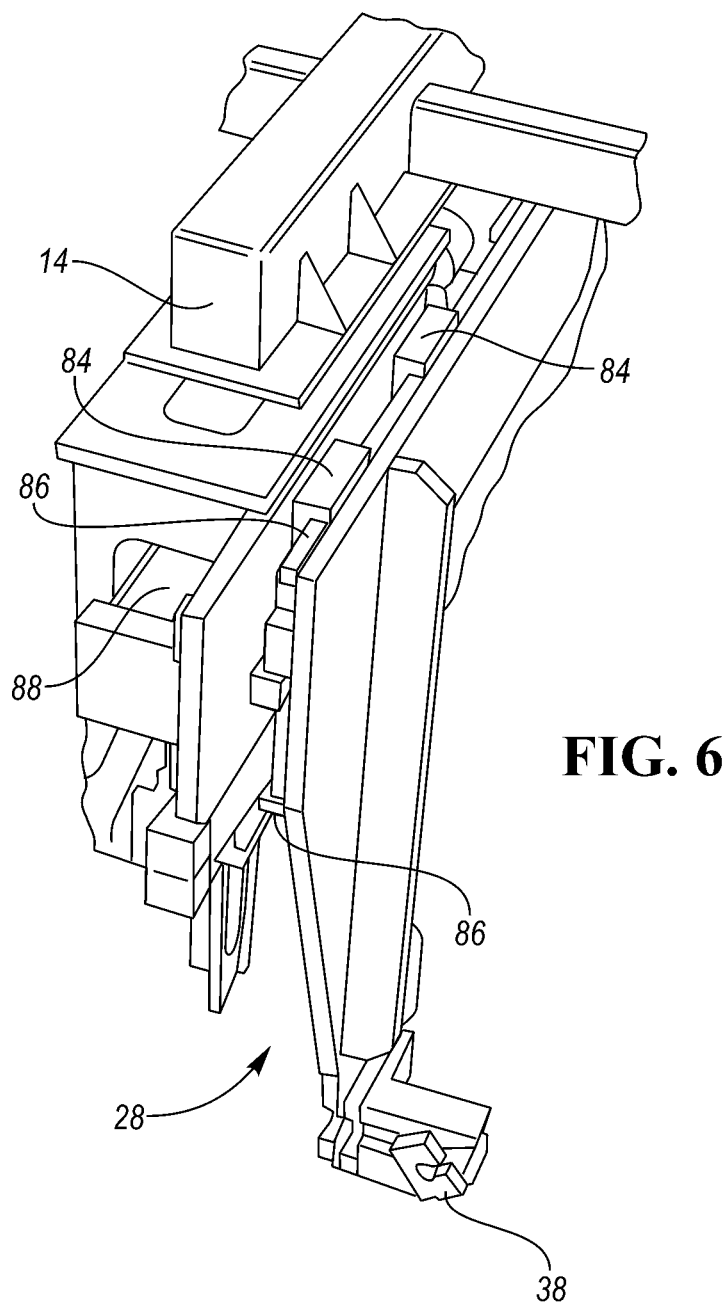
FIG. 6 is an upper perspective view of the tooling that is used to press one of the half shafts into the vehicle axle.

Referring to FIG. 6 an upper perspective view of one of the half shaft pressing tools 28 is illustrated. It should be understood that description of the half shaft pressing tool 28 below may be representative of the each of the pair of half shaft pressing tools 28 of the assembly tool 10. The half shaft pressing tool 28 may be secured to the tooling framework 14 along a linear path by bearing blocks 84 secured to the tooling framework 14 that engage rails 86 secured to the half shaft pressing tool 28. An actuator 88 that is secured to the tooling framework 14 engages the half shaft pressing tool 28 to move the half shaft pressing tool 28 along the linear path to press one of a pair of half shafts 34 into the vehicle axle. It should be understood that there may be intermediate components between either the half shaft pressing tool 28 or the actuator 88 and the tooling framework 14. The actuator 88 is shown to be a pneumatic cylinder. However it should be understood that the actuator 88 may be any type of actuator that is capable of providing linear motion including, but not limited to, pneumatic cylinders, hydraulic cylinders, a ball screw and ball nut combination, a servo motor connected to a mechanical cylinder via gears, etc.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle assembly tool comprising:
a tooling framework;
a vehicle control arm caster and camber setting tool secured to the framework via a fixture that is rotatably secured to the framework and configured to rotate about a yaw axis relative to the vehicle frame;
nut runners secured to the framework and configured to engage fasteners to rotatably fix a vehicle control arm to a vehicle frame; and
a half shaft pressing tool secured to the framework and configured to press a half shaft into a vehicle axle.

2. The tool of claim 1, wherein the caster and camber setting tool includes a pair of locating blocks, each block configured to contact one of a pair of pivot hubs of the control arm and collectively rotate about the yaw axis via the fixture to set the caster and camber positions of the control arm relative to the vehicle frame.

3. The tool of claim 2 further comprising a stop block secured to the fixture along a linear path, the stop block configured to extend into a void defined by the control arm to limit outward transverse movement of the control arm relative to the vehicle frame.

4. The tool of claim 2, wherein the nut runners are secured to the fixture along linear paths and configured to advance and engage the fasteners extending through the pivot hubs to fix a rotatable position of the control arm relative to the vehicle frame.

5. The tool of claim 1, wherein the pressing tool is secured to the framework along a linear path and is configured to engage a first end of the half shall and advance to press a second end of the half shaft into the vehicle axle.

6. The tool of claim 1 further comprising a lifting arm secured to the framework, the lifting arm configured to contact a bottom surface of the vehicle control arm and lift the control arm such that the control arm rotates upwards about pivot hubs of the control arm relative to the vehicle frame.

7. A vehicle assembly tool comprising:
a framework configured to lower into an advanced position over a vehicle frame;
a fixture rotatable secured to the framework and configured to rotate about a yaw axis relative to the vehicle frame;
a pair of locating blocks secured the fixture, each block configured to contact one of a pair of pivot hubs of a vehicle control arm and collectively rotate about the yaw axis via the fixture to set the caster and camber positions of the control arm relative to the vehicle frame;
first and second nut runners secured to the fixture along first and second linear paths, respectively, and configured to advance and engage fasteners extending through the pivot hubs to fix a rotatable position of the control arm relative to the vehicle frame; and a pressing tool secured to the framework along a linear path and configured to engage a first end of a half shaft and advance to press a second end of the half shaft into a vehicle axle.

8. The tool of claim 7 further comprising a stop block secured to the fixture along a linear path, the stop block configured to extend into a void defined by the control arm to limit outward transverse movement of the control arm relative to the vehicle frame.

9. The tool of claim 8 further comprising a pneumatic cylinder configured to advance and retract the stop block.

10. The tool of claim 7 further comprising a lifting arm secured to the framework, the lifting arm configured to contact a bottom surface of the vehicle control arm and lift the control arm such that the control arm rotates upwards about the pivot hubs of the control arm relative to the vehicle frame.

11. The tool of claim 7 further comprising a servo motor configured to rotate the fixture about the yaw axis.

12. The tool of claim 7 further comprising first and second pneumatic cylinders configured to advance and retract the first and second nut runners, respectively.

13. A vehicle assembly tool comprising:
locating blocks configured to engage backsides of pivot hubs of a vehicle control arm and collectively rotate about a yaw axis relative to a vehicle frame to set the caster and camber positions of the control arm;
a pair of nut runners configured to engage fasteners to rotatably fix the pivot hubs to the frame; and
a pressing tool configured to press a half shaft into a vehicle axle, wherein the locating blocks, the pair of nut runners, and the pressing tool are secured to a framework that is configured to lower into an advanced position over the vehicle frame, and wherein the locating blocks are secured to the framework via a fixture that is rotatably secured to the framework and is configured to rotate about the yaw axis relative to the vehicle frame.

14. The tool of claim 13, wherein the pair of nut runners are secured to the fixture along linear paths and configured to advance and engage the fasteners extending through the pivot hubs to fix a rotatable position of the control arm relative to the vehicle frame.

15. The tool of claim 13, wherein the pressing tool is secured to the framework along a linear path and is configured to engage a first end of the half shaft and advance to press a second end of the half shaft into the vehicle axle.

16. The tool of claim 13 further comprising a servo motor configured to rotate the fixture about the yaw axis.

17. The tool of claim 13 further comprising a lifting arm secured to the framework, the lifting arm configured to contact a bottom surface of the vehicle control arm and lift the control arm such that the control arm rotates upwards about the pivot hubs of the control arm relative to the vehicle frame.

* * * * *